(12) United States Patent
Chen et al.

(10) Patent No.: US 11,988,793 B2
(45) Date of Patent: May 21, 2024

(54) WATERFLOOD FRONT IMAGING USING SEGMENTALLY INSULATED WELL LINERS AS ON-DEMAND ELECTRODES

(71) Applicant: ARAMCO SERVICES COMPANY, Houston, TX (US)

(72) Inventors: Hsieh Chen, Cambridge, MA (US); Martin E. Poitzsch, Northumberland, NH (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 505 days.

(21) Appl. No.: 17/038,345

(22) Filed: Sep. 30, 2020

(65) Prior Publication Data

US 2022/0099859 A1  Mar. 31, 2022

(51) Int. Cl.
*G01V 20/00* (2024.01)
*E21B 43/08* (2006.01)
(Continued)

(52) U.S. Cl.
CPC ............ *G01V 20/00* (2024.01); *E21B 43/08* (2013.01); *E21B 47/0025* (2020.05);
(Continued)

(58) Field of Classification Search
CPC ........ G01V 99/005; G01V 3/26; G06F 30/20; E21B 47/0025; E21B 47/113; E21B 43/08
(Continued)

(56) References Cited

U.S. PATENT DOCUMENTS 5,233,304 A * 8/1993 Hubans ............... G01V 3/28
324/333
6,667,621 B1 * 12/2003 Benimeli ............. G01V 3/20
324/347

(Continued)

FOREIGN PATENT DOCUMENTS

WO   2018125207 A1   7/2018

OTHER PUBLICATIONS

Anthony G. Nekut (Crosswell electromagnetic tomography in steel-cased wells, Geophysics, vol. 60, No. 3 (May-Jun. 1995); p. 912-920) (Year: 1995).*

(Continued)

*Primary Examiner* — Iftekhar A Khan
(74) *Attorney, Agent, or Firm* — Osha Bergman Watanabe & Burton LLP

(57) ABSTRACT

A method for monitoring waterfront movement in a subsurface formation involves performing forward modeling of at least one deep electromagnetic survey of the waterfront movement, and determining locations for installing an electrically insulating spacer between well liners to form an on-demand electromagnetic source electrode. Based on the forward modeling, repeat survey time intervals are predicted. The method involves, during well completion, installing the electrically insulating spacer between the well liners in a reservoir to form at least one on-demand electromagnetic source electrode, and installing the electrically insulating spacer between the plurality of well liners in a reservoir to form an on-demand electromagnetic receiver electrode. A waterfront survey is performed by conveying a production logging tool into a well that temporarily converts the well liners into an on-demand electromagnetic source electrode and an on-demand receiver electrode, and inverse (Continued)

modeling of the waterfront survey is performed to produce a water saturation image.

15 Claims, 11 Drawing Sheets

(51) Int. Cl.
    *E21B 47/002*     (2012.01)
    *E21B 47/113*     (2012.01)
    *G01V 3/26*     (2006.01)
    *G01V 3/38*     (2006.01)
    *G06F 30/20*     (2020.01)
    *G06F 111/10*     (2020.01)
    *G06F 113/08*     (2020.01)

(52) U.S. Cl.
    CPC .............. *E21B 47/113* (2020.05); *G01V 3/26* (2013.01); *G01V 3/38* (2013.01); *G06F 30/20* (2020.01); *E21B 2200/20* (2020.05); *G06F 2111/10* (2020.01); *G06F 2113/08* (2020.01)

(58) Field of Classification Search
    USPC .......................................................... 703/10
    See application file for complete search history.

(56) References Cited

U.S. PATENT DOCUMENTS

| | | | |
|---|---|---|---|
| 6,778,918 B2* | 8/2004 | Delhomme | E21B 47/10 702/50 |
| 6,788,065 B1 | 9/2004 | Homan et al. | |
| 8,392,119 B2* | 3/2013 | Alumbaugh | G01V 3/38 702/7 |
| 8,638,103 B2* | 1/2014 | Rosthal | G01V 3/30 324/365 |
| 8,901,931 B2* | 12/2014 | Esmersoy | G01V 3/28 324/338 |
| 9,739,905 B2* | 8/2017 | Sena | G01V 3/30 |
| 10,267,943 B2* | 4/2019 | Marsala | G01V 3/38 |
| 2003/0209347 A1 | 11/2003 | Clark et al. | |
| 2003/0220750 A1* | 11/2003 | Delhomme | E21B 43/20 702/50 |
| 2010/0259268 A1* | 10/2010 | Zhang | G01V 3/28 324/339 |
| 2011/0036569 A1* | 2/2011 | Bass | G01V 3/28 166/250.16 |
| 2011/0308789 A1* | 12/2011 | Zhang | G01V 3/28 166/66.5 |
| 2012/0130641 A1* | 5/2012 | Morrison | G01V 3/26 702/7 |
| 2012/0191353 A1* | 7/2012 | Wilt | G06F 30/23 702/6 |
| 2012/0293179 A1* | 11/2012 | Colombo | G01V 3/26 324/339 |
| 2014/0036628 A1* | 2/2014 | Hill | G01V 1/42 367/35 |
| 2014/0167767 A1* | 6/2014 | Herrera | G01V 3/24 324/339 |
| 2014/0222343 A1* | 8/2014 | Samson | G01V 3/12 702/8 |
| 2015/0061684 A1* | 3/2015 | Marsala | E21B 49/00 324/355 |
| 2015/0101817 A1* | 4/2015 | White | E21B 7/046 175/45 |
| 2015/0369949 A1* | 12/2015 | Cuevas | G01V 3/26 324/338 |
| 2016/0266269 A1* | 9/2016 | Wilson | G01V 3/108 |
| 2016/0290124 A1* | 10/2016 | Chemali | E21B 47/113 |
| 2017/0082770 A1* | 3/2017 | Mandviwala | E21B 47/12 |
| 2017/0138132 A1* | 5/2017 | Wilson | E21B 49/00 |
| 2017/0284190 A1* | 10/2017 | Dashevsky | E21B 49/08 |
| 2017/0292367 A1* | 10/2017 | Fouda | E21B 47/113 |
| 2018/0128097 A1* | 5/2018 | DePavia | E21B 47/13 |
| 2018/0223654 A1* | 8/2018 | Roberson | E21B 47/16 |
| 2018/0231681 A1* | 8/2018 | Katterbauer | G01V 3/36 |
| 2018/0259672 A1* | 9/2018 | Samson | G01V 3/28 |
| 2018/0283168 A1* | 10/2018 | Ranjan | G01V 3/26 |
| 2020/0319365 A1* | 10/2020 | Colombo | G01V 3/088 |
| 2020/0348440 A1* | 11/2020 | Cancelliere | G01V 20/00 |
| 2020/0363554 A1* | 11/2020 | Colombo | E21B 43/20 |
| 2021/0140307 A1* | 5/2021 | McNeice | G01V 3/08 |
| 2022/0099859 A1* | 3/2022 | Chen | E21B 43/08 |

OTHER PUBLICATIONS

Sena et al. (Borehole Electromagnetic Technique for Reservoir Imaging and Monitoring from Uncased Sections of a Well Using Adjacent Casings as Receiver Antennas,2019, International Petroleum Technology Conference, pp. 1-7) (Year: 2019).*

Shantsev et al. (Time-lapse CSEM: how important is survey repeatability, 2020, Geophys. J. Int. pp. 2133-2147) (Year: 2020).*

Marsala et al.; "Crosswell Electromagnetic Tomography in Haradh Field: Modeling to Measurements", Saudi Aramco Journal of Technology, Winter 2007, pp. 65-73 (9 pages).

Marsala et al.; "Saturation Mapping in the Interwell Reservoir Volume: A New Technology Breakthrough", SPE-187371-MS, Society of Petroleum Engineers Inc., Oct. 2017 (10 pages).

Bryant et al.; "Utility and Reliability of Cemented Resistivity Arrays in Monitoring Waterflood of the Mansfield Sandstone, Indiana, USA", SPE 71710, Society of Petroleum Engineers Inc., Oct. 2001 (16 pages).

Bryant et al.: "Real-Time Monitoring and Control of Water Influx to a Horizontal Well Using Advanced Completion Equipped with Permanent Sensors", SPE 77522, Society of Petroleum Engineers, Oct. 2004 (13 pages).

Van Kleef et al.; "Water Flood Monitoring in an Oman Carbonate Reservoir Using a Downhole Permanent Electrode Array", SPE 68078, Society of Petroleum Engineers Inc., Mar. 2001 (11 pages).

Kuchuk et al.; "Determination of In Situ Two-Phase Flow Properties Through Downhole Fluid Movement Monitoring", SPE 116068, Society of Petroleum Engineers, Sep. 2008 (13 pages).

Jackson et al.; "Spontaneous Potentials in Hydrocarbon Reservoirs During Waterflooding: Application to Water-Front Monitoring", SPE 135146, Sep. 2010 (17 pages).

International Search Report and Written Opinion of the International Searching Authority issued in corresponding International Application No. PCT/US2021/052919, dated Jan. 17, 2022 (20 pages).

Nekut A G: "Crosswell Electromagnetic Tomography in Steel-Cased Weels", Geophysics, Society of Exploration Geophysicists, US, vol. 60, No. 3. May 1, 1995, pp. 912-920, XP000515653 (9 pages).

N. Panwar et al.; "Induced Polarization of Carbonates", Journal of Geophysical Research: Solid Earth, American Geophysical Union, 2021; 126(6); pp. 1-24 (24 pages).

S. R. Hussaini and J. Dvorkin; "Specific surface area versus porosit from digital images", Journal of Petroleum Science and Engineering; vol. 196; Aug. 16, 2020; pp. 1-12 (12 pages).

* cited by examiner

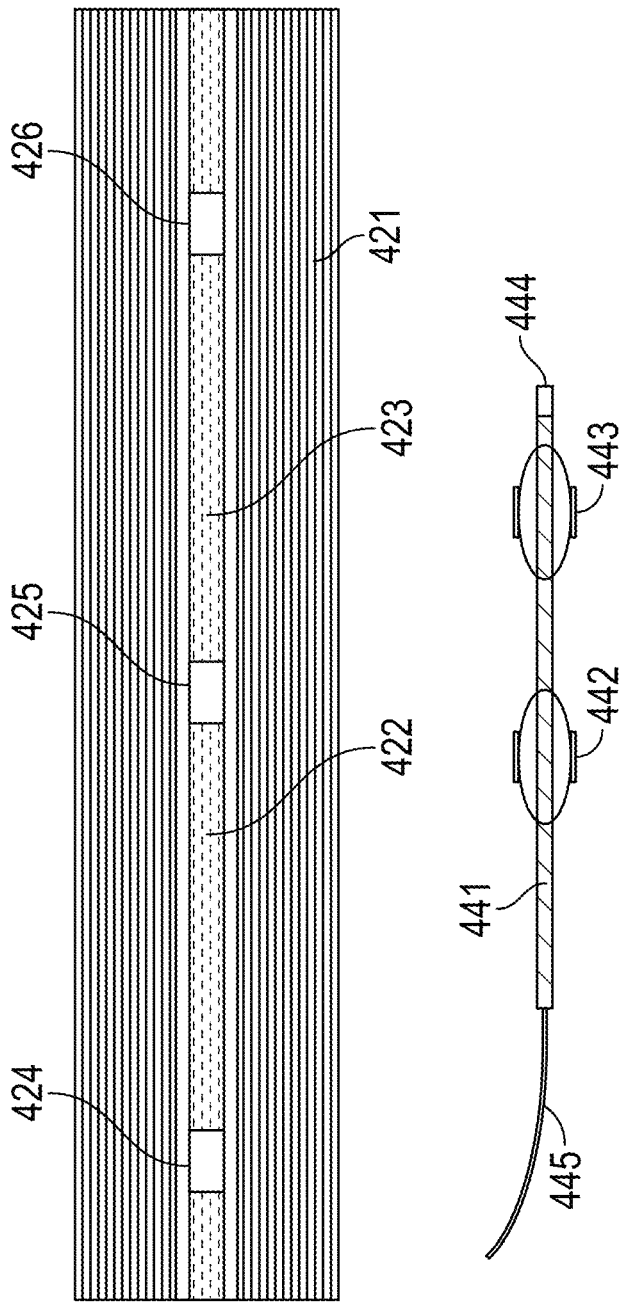
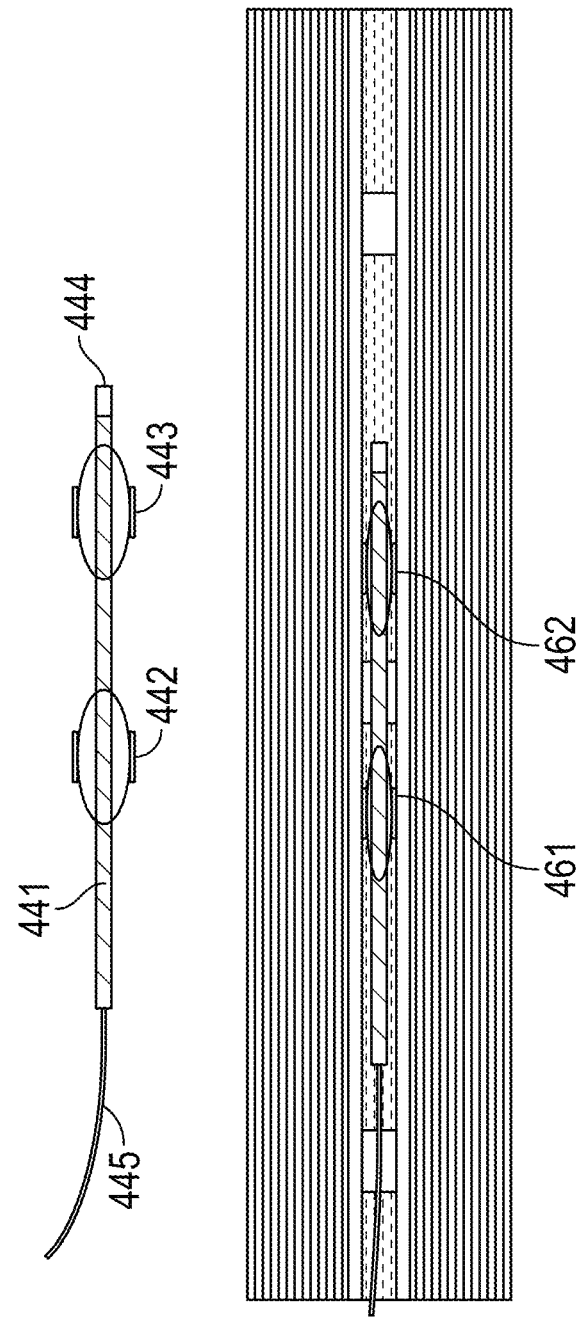

*[dx=500m; lz=100m; R1=100Ω·m; R2=1Ω·m; V1=1V; wy=100m]*

WATERFLOOD FRONT IMAGING USING SEGMENTALLY INSULATED WELL LINERS AS ON-DEMAND ELECTRODES

BACKGROUND

Hydrocarbon resources are often located below the earth's surface, sometimes tens of thousands of feet below the surface. In order to extract hydrocarbon fluids, that is, oil and/or gas, wells may be drilled to gain access to reservoirs found in subterranean porous rock formations. Wells may be drilled vertically into the earth or deviated from vertical, even up to horizontal in order to most effectively and efficiently access subsurface hydrocarbon reservoirs.

Wells may be cased to protect the integrity of the well and the surrounding formations through which the wellbore may pass. Casing may be fixed in place by injecting cement into the annulus between the casing and the surrounding formation. Casing may be conductive, for example, the casing may be made of some form of metal, particularly a form of steel. Less frequently, non-conductive casing may be used as well.

During the productive lifetime of an oil well (hereinafter, oil well is understood to include any well that used in the production of hydrocarbon fluids), subsurface water may move toward a producing well. In some cases, this may occur naturally, while in other cases, water may be injected into one or more neighboring wells to drive the hydrocarbon fluids in the reservoir toward the producing well. Accurately monitoring the waterflood front may provide valuable information in optimizing well productivity.

Deep electromagnetic (EM) surveys have long been of great interest for oil companies as a means to monitor waterflood fronts. EM surveys have provided invaluable information for reservoir-scale saturation mapping with unprecedented details. However, when conducted on existing wells, there may be some limitations for the EM surveys. For example, dedicated EM transmitters and receivers used for EM surveys may be thicker and longer than conventional logging tools, which may increase the difficulty for their conveyance for downhole surveys. Further, typical data acquisition time for these EM surveys may range from multiple days to weeks, resulting in downtimes for normal field operations and costs associated with the downtime. In addition, metal casings may greatly attenuate the EM sensitivity, which may limit which wells may be selected for monitoring.

Downhole permanent electrode arrays may offer the possibility of long-term continuous monitoring of adjacent water movements to aid in reservoir management. However, extremely high upfront cost for installation of downhole permanent electrode arrays as well as suboptimal reliability for the downhole sensors has limited their applicability.

SUMMARY

In general, in one aspect, embodiments disclosed herein relate to a method for monitoring waterfront movement in a subsurface formation, the method includes: performing forward modeling of at least one deep electromagnetic survey of the waterfront movement: determining, based on the forward modeling, locations for installing at least one electrically insulating spacer between a plurality of well liners to form at least one on-demand electromagnetic source electrode: predicting, based on the forward modeling, repeat survey time intervals: during well completion, installing the at least one electrically insulating spacer between the plurality of well liners in a reservoir to form at least one on-demand electromagnetic source electrode: during well completion, installing the at least one electrically insulating spacer between the plurality of well liners in a reservoir to form at least one on-demand electromagnetic receiver electrode: electromagnetically performing a waterfront survey by conveying into a well at least one production logging tool that temporarily converts the plurality of well liners into at least one on-demand electromagnetic source electrode and at least one on-demand receiver electrode: performing inverse modeling of the waterfront survey: and producing, based the inverse modeling, a water saturation image.

In general, in one aspect, embodiments disclosed herein relate to a system for monitoring waterfront movement in a subsurface formation, the system including: a plurality of well liners disposed in at least one well. Each well liner includes an electrically conductive material having a shape of a hollow cylinder: at least one electrically insulating spacer disposed between two of the plurality of well liners to form at least one on-demand electromagnetic source electrode: at least one electrically insulating spacer disposed between two of the plurality of well liners to form at least one on-demand electromagnetic receiver electrode: a well logging tool including: a cylindrical housing having an outer diameter less than an inner diameter of the hollow cylinder: a plurality of insulated centralizers disposed around the cylindrical housing: a plurality of electrical connections that selectively connect to at least one of the plurality of well liners: a power connection that receives power from a surface location, and a communication connection that communicates with the surface location: and a conveyor that disposes the well logging tool within the plurality of well liners.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 4A-4D are schematic diagrams of a workflow in accordance with one or more embodiments.

DETAILED DESCRIPTION

Figure 1:
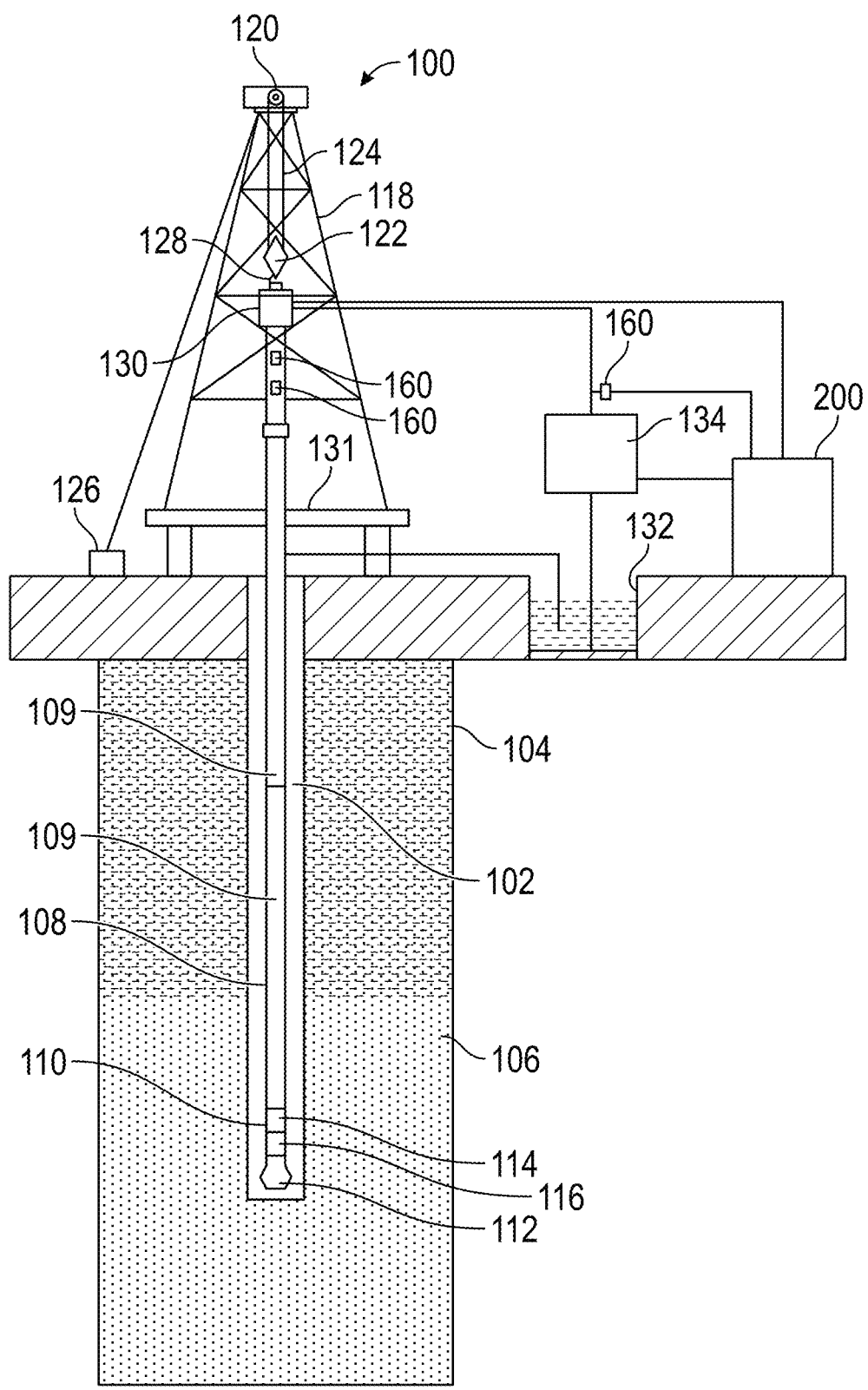
FIG. 1 is a schematic diagram of an exemplary well site in accordance with one or more embodiments.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with hydrocarbon production systems have not been shown or described in detail to avoid unnecessarily obscuring descriptions of the implementations and embodiments. For the sake of continuity, and in the interest of conciseness, same or similar reference characters may be used for same or similar objects in multiple figures.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A deviated well, as used herein, describes a well whose wellbore is not vertical. A horizontal well is a special case of a deviated well in which the wellbore is essentially horizontal, but may deviate from the vertical by at least 80 degrees. A horizontal well may stay in a hydrocarbon reservoir for a greater length of the reservoir, allowing greater hydrocarbon production from the well.

A screen, or sand screen, or wire-wrapped screen, as used herein, refers to a device used to control formation sand from entering production tubing used to bring hydrocarbon fluids to the surface. A screen may include a perforated liner with perforations shaped as elongated slots or round holes. The dimensions of the screen and its components may be varied to suit the reservoir conditions.

As used herein, a logging unit, for example, a production logging unit, is where a logging engineer may control and monitor a well logging operation. A logging unit may contain such instruments as a data recorder, a depth recording system, and a winch.

In this disclosure, the terms well, oil well, gas well, oil and gas well, and like terms may be used interchangeably without narrowing the type of well unless specifically stated.

Regarding directions of a coordinate system, the axial direction may be a direction parallel to an axis of rotation. In a well, the axial direction may be the direction parallel to the wellbore and may be local. That is, if the wellbore changes direction along its length, one may still refer to an axial direction at any point along the wellbore as being tangential to the direction of the wellbore at that location. The radial direction is perpendicular to the axial direction and points along a radius away from the axis. The azimuthal direction is perpendicular to the axial and the radial directions.

A fluid is a material that is capable of flowing. Thus, both liquids and gases are fluids. In oil and gas wells, oil, gas, and water are examples of fluids that may be encountered.

FIG. 1 illustrates an exemplary well site 100. In general, well sites may be configured in a myriad of ways. Therefore, well site 100 is not intended to be limiting with respect to the particular configuration of the drilling equipment. Well site 100 is depicted as being on land. In other examples, well site 100 may be offshore, and drilling may be carried out with or without use of a marine riser. A drilling operation at well site 100 may include drilling a wellbore 102 into a subsurface including various formations, such as formations 104, 106. For the purpose of drilling a new section of wellbore 102, a drill string 108 is suspended within wellbore 102. Drill string 108 may include one or more drill pipes 109 connected to form conduit and a bottom hole assembly (BHA) 110 disposed at the distal end of the conduit. The BHA 110 may include a drill bit 112 to cut into the subsurface rock. The BHA 110 may include measurement tools, such as a measurement-while-drilling (MWD) tool 114 and logging-while-drilling (LWD) tool 116. Measurement tools 114, 116 may include sensors and hardware to measure downhole drilling parameters, and these measurements may be transmitted to the surface using any suitable telemetry system known in the art. The BHA 110 and drill string 108 may include other drilling tools known in the art but not specifically shown.

Drill string 108 may be suspended in wellbore 102 by a derrick 118. A crown block 120 may be mounted at the top of derrick 118, and a traveling block 122 may hang down from crown block 120 by means of a cable or drilling line 124. One end of cable 124 may be connected to a drawworks 126, which is a reeling device that can be used to adjust the length of cable 124 so that traveling block 122 moves up or down derrick 118. Traveling block 122 may include a hook 128 on which a top drive 130 is supported. Top drive 130 is coupled to the top of drill string 108 and is operable to rotate drill string 108. Alternatively, drill string 108 may be rotated by means of a rotary table (not shown) on the drilling floor 131. Drilling fluid (commonly called mud) may be stored in a pit (mud pit) 132, and at least one pump 134 may pump the mud from pit 132 into drill string 108. The mud may flow into drill string 108 through appropriate flow paths in top drive 130 (or a rotary swivel if a rotary table is used instead of a top drive to rotate drill string 108).

In one implementation, a system 200 may be disposed at or communicate with well site 100. System 200 may control at least a portion of a drilling operation at well site 100 by providing controls to various components of the drilling operation. In one or more embodiments, system 200 may receive data from one or more sensors 160 arranged to measure controllable parameters of the drilling operation. As a non-limiting example, sensors 160 may be arranged to measure WOB (weight on bit), RPM (drill string rotational speed), GPM (flow rate of the mud pumps), and ROP (rate of penetration of the drilling operation). Sensors 160 may be positioned to measure parameter(s) related to rotation of drill string 108, parameter(s) related to travel of the traveling block 122, which may be used to determine ROP of the drilling operation, and parameter(s) related to flow rate of pump 134. For illustration purposes, sensors 160 are shown on drill string 108 and proximate mud pump 134. The illustrated locations of sensors 160 are not intended to be limiting, and sensors 160 could be disposed wherever drilling parameters need to be measured. Moreover, there may be many more sensors 160 than shown in FIG. 1 to measure various other parameters of the drilling operation. Each sensor 160 may be configured to measure a desired physical stimulus.

During a drilling operation at well site 100, drill string 108 is rotated relative to wellbore 102, and weight is applied to drill bit 112 to enable drill bit 112 to break rock as drill string 108 is rotated. In some cases, drill bit 112 may be rotated independently with a drilling motor. While cutting rock with drill bit 112, mud is pumped into drill string 108. The mud flows down drill string 108 and exits into the bottom of wellbore 102 through nozzles in drill bit 112. The mud in wellbore 102 then flows back up to the surface in an annular space between drill string 108 and wellbore 102 with entrained cuttings. The mud with the cuttings is returned to pit 132 to be circulated back again into drill string 108. Typically, the cuttings are removed from the mud, and the mud is reconditioned as necessary, before pumping the mud again into drill string 108. In one or more embodiments, the drilling operation may be controlled by system 200.

Figure 2:
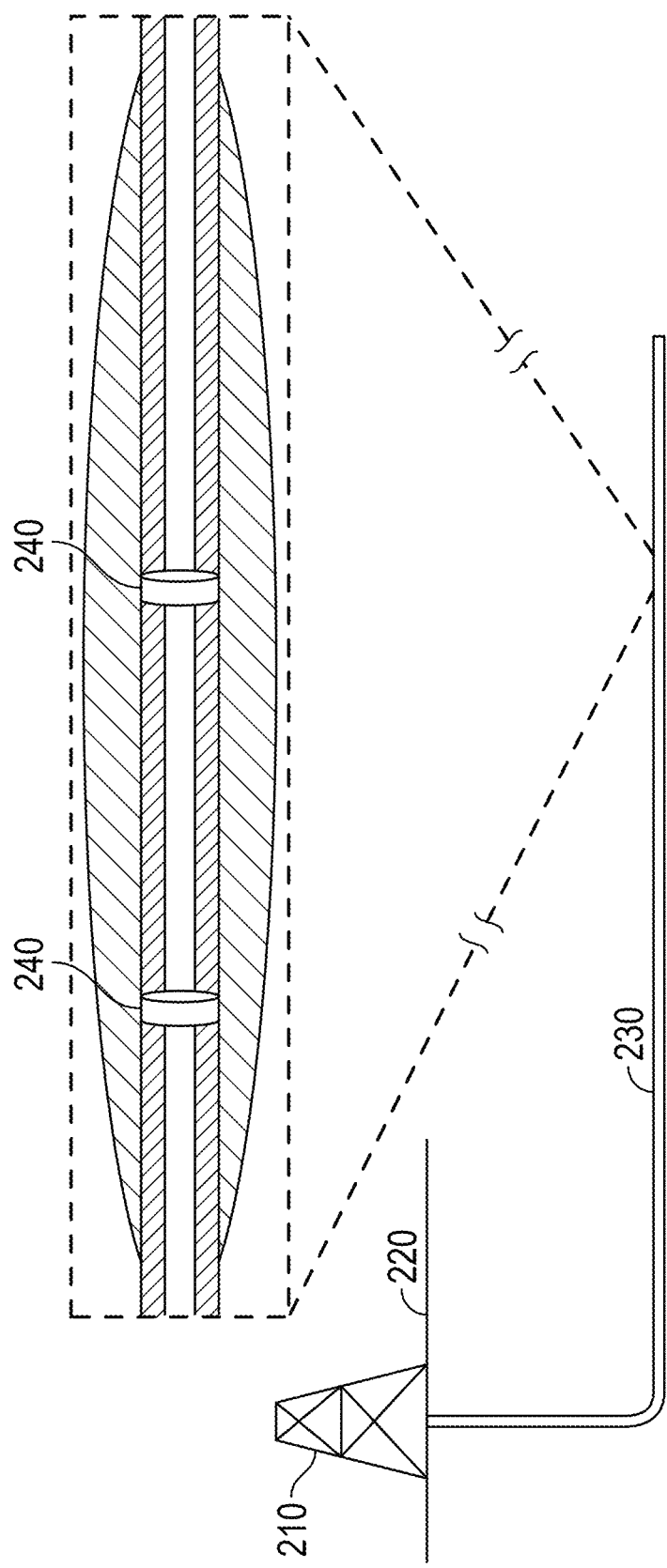
FIG. 2 is a schematic diagram of a downhole permanent electrode array.

Referring now to FIG. 2, a drilling rig 210 may be erected on a surface 220 for the purpose of drilling a well, particularly a well for the production of hydrocarbon fluids that may be contained in a subterranean porous rock formation, or reservoir. The surface 220 may be the earth's surface if the drilling rig 210 is a land rig. If the drilling location is offshore, the surface 220 may be on a drill ship, an offshore platform, or the like. The well may be deviated, and in particular, may be horizontal 230 in order to maintain the well in the hydrocarbon reservoir over an extended distance. Permanent downhole electrodes 240 may be installed to monitor a waterflood front by providing a deep electromagnetic (EM) survey. However, such installations may be too expensive for some applications.

Some wells may be completed with metallic casing which may be inserted into the well and cemented into place. However it is common practice, particularly in hydrocarbon reservoirs in strong, rigid (competent) reservoir rocks including, but not limited to, carbonate reservoirs rocks, to use openhole, or barefoot, completions for many wells. In openhole completions no casing is used. Instead, an uncemented metallic liner may be inserted into the well and may act as a conduit through which hydrocarbon fluids may flow to the surface. The portion of the liner that traverses the hydrocarbon reservoir may include slots through which fluids may flow from the reservoir into the production conduit. The portion of the liner that traverses the hydrocarbon reservoir may include a sand-screen that prevents solid particles, such as sand, from entering the production conduit.

In one or more embodiments, a method for monitoring waterfront movement in a subsurface formation from a well with an openhole completion may include a deep EM survey using well liners segmentally insulated with nonconductive spacers, that is, insulating spacers, and production logging (PL) tools. This method may include the installation of passive insulators, or spacers, between well liners, or well liner segments, in a way that produces minimum interference with well completion processes and much lower failure rates compared to the installation of permanent active downhole sensors. The upfront hardware required in one or more embodiments may include, without limitation, a plurality of insulated spacers to electrically isolate a plurality of electrically conducting (metallic) liner segments. In one or more embodiments, the insulated spacers may be constructed from ceramic, or thermoplastic materials, or other electrically insulating materials. In accordance with one or more embodiments, the number of insulated spacers may be small, for example five or fewer, thus the upfront hardware cost may be negligible, particularly when compared to permanent active downhole sensors.

Further, the conveyance of a PL tool to convert the well liners into EM electrodes may be simpler, less costly, more versatile, and more sensitive compared to the conveyance of dedicated EM transmitters and receivers in existing completed wells. In addition, the conveyance of the PL tool could potentially be accomplished with wireline cased-hole tractors, which may be much less costly than using coiled tubing conveyance. Tough Logging Conditions (TLC) conveyance may also be used.

Further still, the method according to one or more embodiments may be applicable to open-hole, or barefoot, completions, where no casing is used in the wellbore so that produced hydrocarbon fluids flow directly into the wellbore, and thence through a liner, which may be equipped with a sand-screen into the production conduit.

Figure 3:
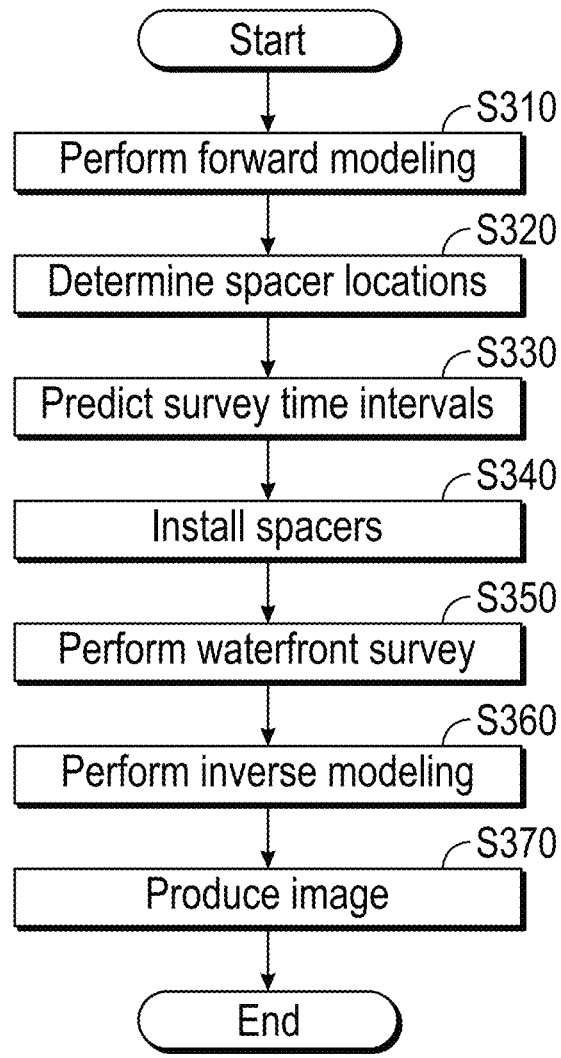
FIG. 3 is a flowchart describing a method in accordance with one or more embodiments.

Referring now to FIG. 3, in one or more embodiments, the method for monitoring waterfront movement in a subsurface formation includes, considering the wells development plan for the field, performing forward modeling of at least one deep EM survey of the waterfront movement (S310) to select wells in which to install insulating spacers between metal well liners or well liner segments and to predict time intervals at which the deep EM survey needs to be repeated (S330).

Forward modeling of a deep EM survey includes, in one or more embodiments, solving a coupled system comprising Maxwell's equations and the constitutive equations for the rock formations using an assumed spatial distribution of resistivity and permittivity within the reservoir. The voltages and currents applied to the source electrodes are used as boundary conditions. The solution of the coupled system may in some embodiments involve the application of a finite-difference, or a finite-element algorithm to predict the EM fields detected by the receiver electrodes. In accordance, the solution of the coupled system may be achieved in the time-domain or in the frequency domain.

In other embodiments, particularly when the spatial distribution of resistivity and permittivity within the reservoir is highly symmetric, for example, layered or homoegenous, Maxwell's equations and the constitutive equations may be simplified, and solved analytically or quasi-analytically.

The method may also include determining, based on the forward modeling, locations for installing at least one electrically insulating spacer between selected well liners of a plurality of well liners in a reservoir under development during well completion (S320) and installing the spacers in those locations (S340).

The method may include performing the deep EM survey by conveying specially designed PL tools into wells so that the PL tools may temporarily convert the segmentally insulated well liners into on-demand EM electrodes (sources and receivers) and establish a baseline measurement (S350).

In one or more embodiments, the method may include performing repeated surveys and evaluating measurement changes over time. The method may also include estimating the proximity of a waterfront or other conductivity discontinuity by comparison with forward modeling.

The method may include performing inverse modeling (S360) and, based on the inverse modeling, producing 2D and/or 3D water saturation images (S370). In contrast to forward modeling which predicts an EM field at a receiver electrode from known source electrode voltages and currents, and an assumed spatial distribution of resistivity and permittivity within the reservoir, inverse modeling predicts the spatial distribution of resistivity and permittivity within the reservoir given the measured EM fields at the receiver electrodes and the known source electrode voltages and currents. In some embodiments, inverse modeling is achieved by iteratively performing forward modeling and comparing the predicted values of the EM field at the receiver electrode with the measured value and adjusting the assumed spatial distribution of resistivity and permittivity within the reservoir to obtain a better match between the predicted and measured values.

The method may also optimize the deep EM survey based on observed waterfront movements, costs, and other reservoir characteristics. For example, the optimum survey design may depend, without limitation, on well spacings, well path trajectories, reservoir thickness and uniformity, resistivity contrast between waterflood front and reservoir, and resistivity contrast between reservoir, and caprock, and basement strata.

Figure 4A:
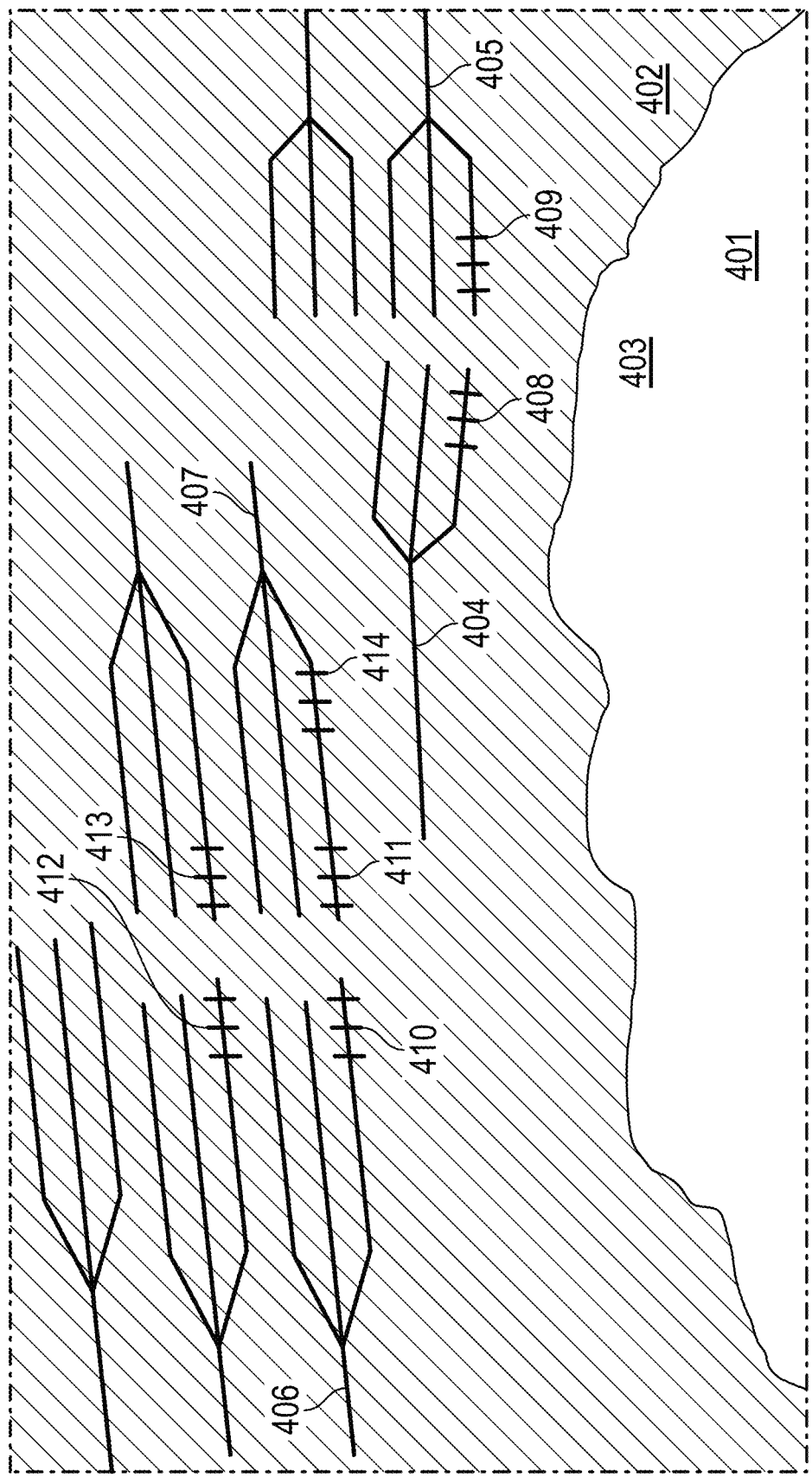

Some of the details of the workflow may be seen by referring to FIG. 4A. FIG. 4A shows a schematic of a contemporary reservoir with multiple horizontal wells 404, 405, 406, 407 and a waterfront 403 that forms the boundary between water 401 and oil 402 in the reservoir. During hydrocarbon fluid production, the waterfront 403 may approach production wells 404, 405, 406, 407. Forward modeling may be used to predict the response of EM surveys and to select positions to place electrically insulating spacers, represented as lines crossing the wells in FIG. 4A, between well liners or well liner segments. The insulating spacers may be put at the end of wells nearest to the waterfront 408, 409. However, the insulating spacers may be put in other places for potential later use 410, 411, 412, 413, 414.

The distances between insulated well liner segments on different wells (e.g., 408 to 409) may range from 100 to 1000 meters. The distances between insulated well liner segments to waterfront (e.g., 409 to 403) may also range from 100 to 1000 meters.

With typical waterfront movement of approximately 1 foot per day (ft/day) (about 110 meters/year), the EM surveys may be performed once or twice a year.

FIG. 4B shows a part of an open hole well with liners 422, 423 segmentally separated by insulating spacers 424, 425, 426 in reservoir formation 421 according to one or more embodiments. The metal liners 422, 423 may be steel tubes about 40 ft in length and 4½ inches in diameter. According to one or more embodiments, nonmetallic, insulating spacers 424, 425, 426, such as ceramics or thermoplastics, may be used to connect well liners so that individual well liners can act as electrodes separately. Note conventionally the well liners are connected with metal-on-metal connections, which would not work in these embodiments because with metal connections all well liners would be electrically shorted together and could not be converted to electrodes segmentally. The lengths of the spacers 424, 425, 426 may be less than 10 inches with diameters slightly larger than the diameters of the well liners.

FIG. 4C shows a PL tool 441 designed especially for one or more embodiments. The PL tool 441 may comprise insulated centralizers 442, 443. In one or more embodiments, the PL tool 441 may have an outer diameter of 1¹¹⁄₁₆ inches and be powered by low-voltage PL cable 445, which transmits power from the surface. In FIG. 4C, the PL tool 441 includes a casing collar locator (CCL) 444 that may be used for depth control, allowing proper positioning of the PL tool 441 with respect to the metal liners 422, 423 and insulating spacers 424, 425, and 426. The depth control may be used to place the PL tool 441 in the correct position with respect to the well liner segments to be used as on-demand electrodes.

FIG. 4D shows the conveying of the PL tool into a well and converting the segmentally insulated well liners into on-demand electrodes. PL tools may be adapted to traverse liners and selectively address (ground, excite, monitor) specific segments on demand from the inside of the well liners. A standard 1¹¹⁄₁₆ inch housing diameter PL tool would fit within a metal liner with a diameter of, for example, 4½ inches. Custom bow-spring or 4-arm bow-spring centralizers 442, 443 may apply the electrical contact to the inner diameter (ID) of liner segments 461, 462 as seen in FIG. 4D. Such tools may be compatible with cartridges and logging heads with casing-collar locators (CCL) 444 for depth control; and standard cased-hole telemetry may be appropriate for this low-data-rate measurement. The PL tool 441 may be operated with excitations of a volt (or maybe up to 10 V) The PL tool 441 may operate in the frequency range between 1 Hertz and 1000 Hertz, with typical frequencies around 10 Hertz, and total currents injected into the reservoir may be on the order of tenths of an ampere (A) to a few amperes. Thus, it may be possible to operate within fairly standard cased-hole power budgets of a few tens of volt-amperes (V-A). A small-diameter coaxial cable 445 may be used to power these tools.

Nonmetallic couplings or breaks between drillpipe or well casing joints have never caught on in the Industry due to concerns about reliability. Drillpipe has to sustain pressure differences and extreme bending and torques and tensions and compressions, and all that over millions of rotation cycles! Oil well casing has to sustain very large pressure differences and is often inserted from the surface, thereby experiencing very high tensions and bending to keep a long string together. However, slotted well liners or sand-screens experience much less force and bending, and that over often just one installation cycle. Slotted well liners and sand-screens do not have to sustain any pressure differences and remain static in their rather generously oversized open-hole wellbore, once installed. For these reasons, nonmetallic, insulating couplings using standard well liner thread designs may be qualified for use in that environment. Possible materials for the insulating spacers include tough ceramics, such as transition-toughened zirconia (TTZ) and reinforced thermoplastics, such as glass-fiber-reinforced PEEK, which has been qualified for a number of downhole applications, including on logging while drilling (LWD) drilling tools.

Figure 5A:
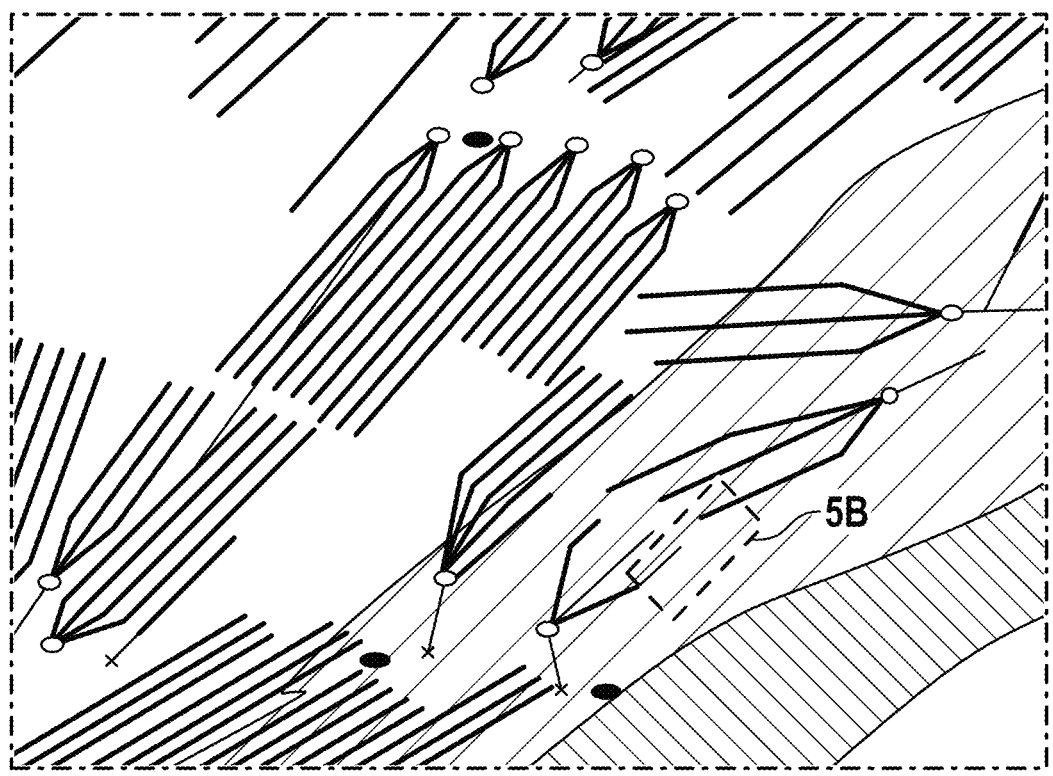
FIG. 5A is a schematic diagram of a contemporary field with complex horizontal wells in accordance with one or more embodiments.
Figure 5B:
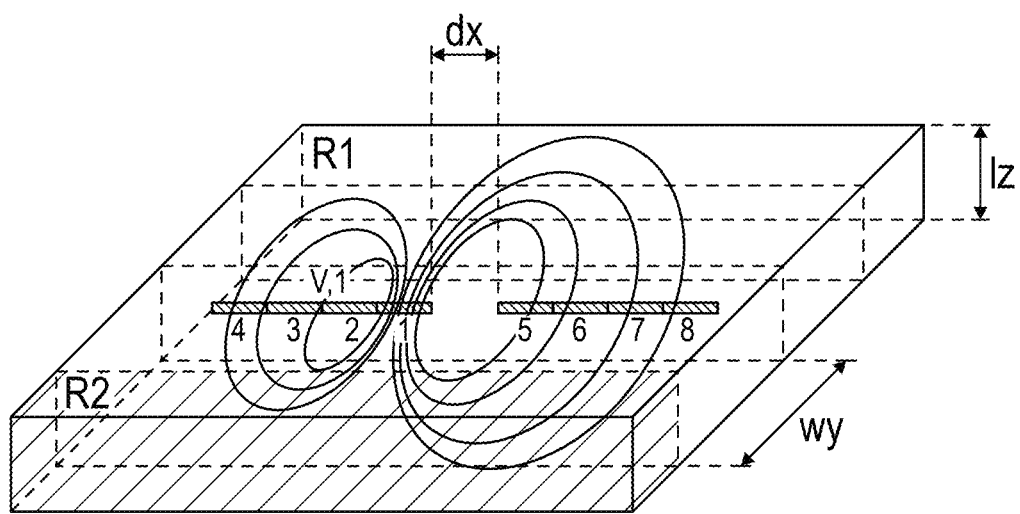
FIG. 5B is a schematic diagram of a simulated domain containing two well liners with each well liner consisted of four conducting segments separated by insulators in accordance with one or more embodiments.

FIG. 5A shows schematically a model contemporary field with complex horizontal wells considered in a simulation study. The actual simulated domain (FIG. 5B) was chosen to have a good view to the encroaching waterflood and includes two horizontal well liners with each well liner consisting of four segments (1, 2, 3, 4 and 5, 6, 7, 8) separated by insulators. The modeled reservoir sizes were 2000 m×2000 m×50 to 250 m in thickness, lz, and the well liner segment sizes were 50 m×0.2 m×0.2 m. The well separations, dx, were from 100 to 500 m. The distances, wy, between the waterfront and the wells were 100 to 900 m. The resistivity, R1, of the reservoir varied from 100 to 1 ohm-meters ($\Omega \cdot m$), and the resistivity, R2, of the waterfront varied from 1 to 100 $\Omega \cdot m$.

Figure 6A:
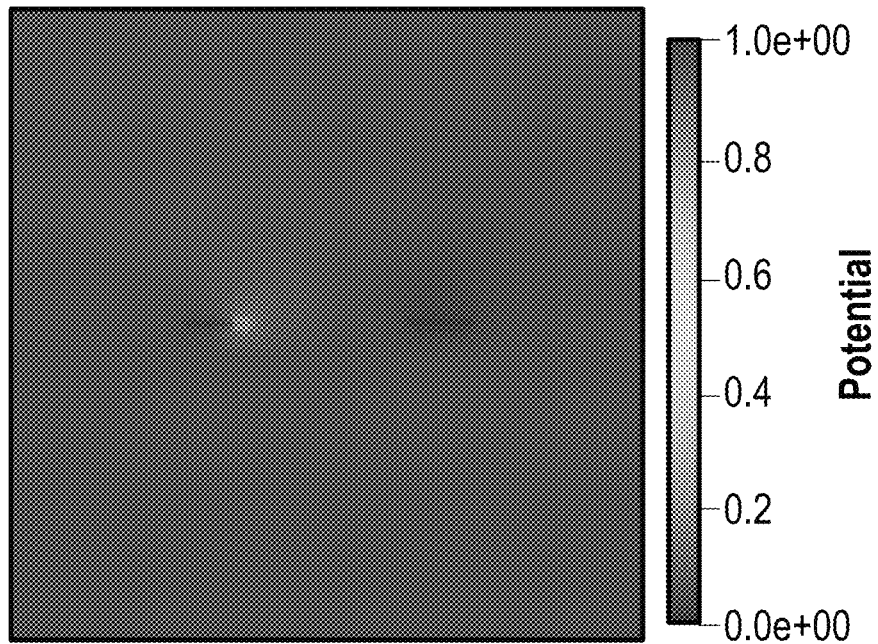
FIGS. 6A and 6B represent potential and current density fields, respectively, calculated from finite element analysis in accordance with one or more embodiments.
Figure 6B:
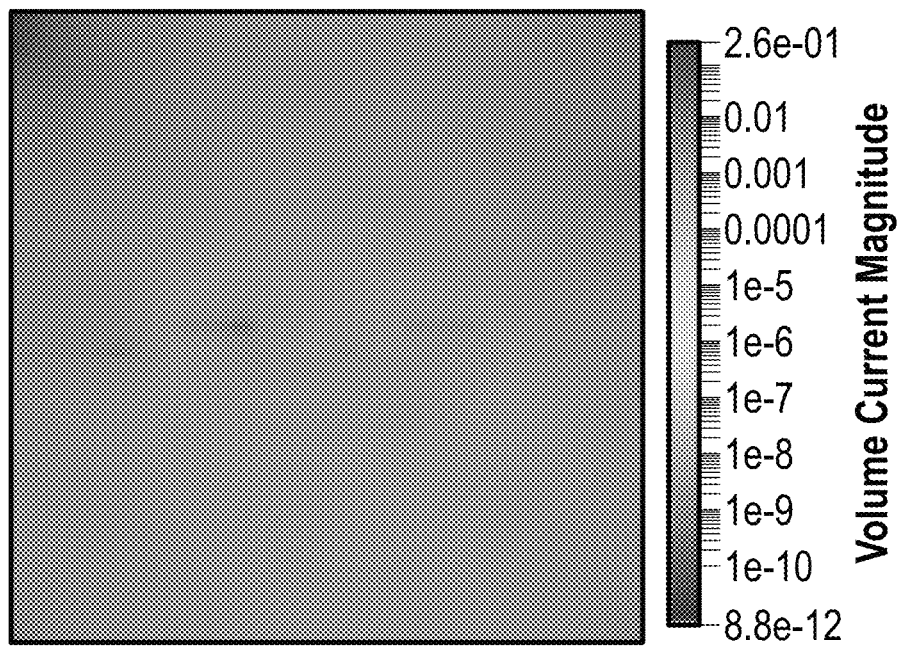

In this simulation, a very low-frequency array operation at a few hertz (Hz) or tens of Hz is be approximated by a static (DC) analysis. The EM modeling may be performed using the open source multi-physical simulation software Elmer FEM with the static current solver. In other embodiments, a computer system may be used that is similar to the computer system 1002 that is described below in FIG. 10 and the accompanying description. The finite element meshes were prepared by Gmsh, an open-source mesh generator. Electrode 1 was kept at V1=1 V, and electrodes 2-8 were kept at 0 V (compare FIG. 5B for representative current lines). The representative potential and current density fields calculated from finite element analysis are shown in FIGS. 6A and 6B, respectively.

Figure 7A:
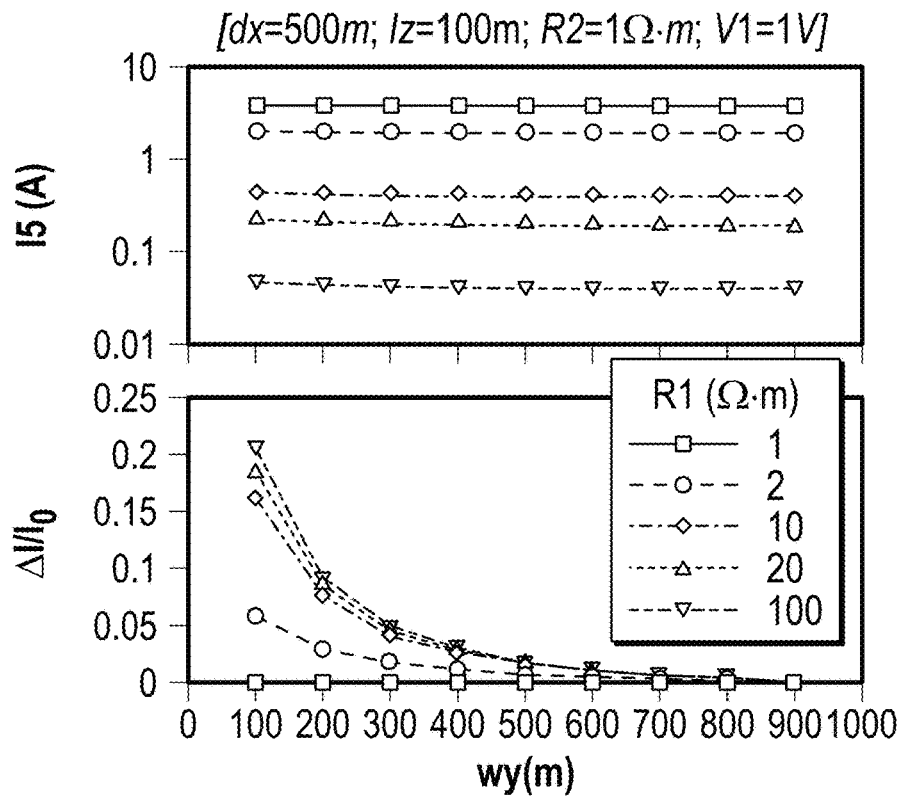
FIG. 7A shows current flowed into an electrode (top) and normalized current changes (bottom) as a function of waterfront-to-electrode distance for various reservoir resistivities in accordance with one or more embodiments.
Figure 7B:
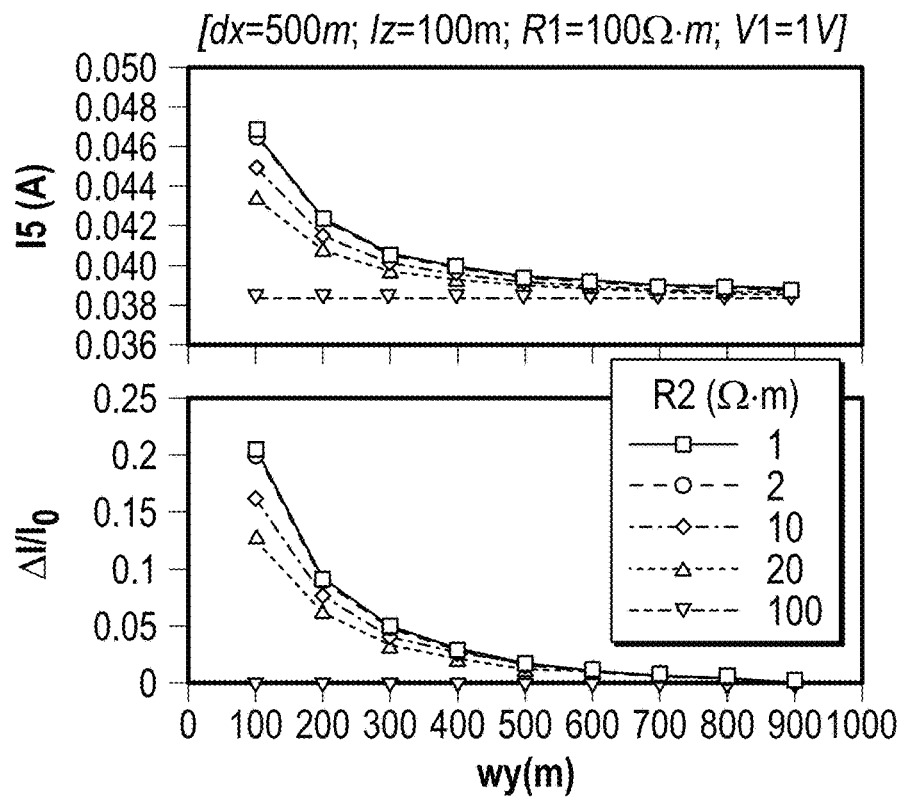
FIG. 7B shows current flowed into an electrode (top) and normalized current changes (bottom) as a function of water-front-to-electrode distance for various waterfront resistivities in accordance with one or more embodiments.

To simulate waterfront movements, the current flowed into electrode 5 (I5) may be calculated for different waterfront-to-electrode distances (wy). We first discuss the effects of reservoir and waterfront resistivity differences. FIG. 7A shows the I5-wy curves with fixed waterfront resistivity R2=1 $\Omega \cdot m$ with reservoir resistivity R1 ranging from 1 to 100 $\Omega \cdot m$. As shown, the total current ranged from ~0.04 to 4 A. In FIG. 7A, we also plotted the normalized current changes $\Delta I/I0$, where $\Delta I=I-I0$ and $I0=I$ at wy=900 m. It was observed that $\Delta I/I0>1\%$ for wy<600 m if R1/R2>10. FIG. 7B shows the I5-wy curves with fixed reservoir resistivity R1=100 $\Omega \cdot m$ with waterfront resistivity R2 ranging from 1 to 100 $\Omega \cdot m$. As shown, total current 15 was all around 0.04-0.05 A. Nevertheless, one may still detect waterfront movement with $\Delta I/I_0>1\%$ for wy<600 m if R1/R2>5.

Figure 8A:
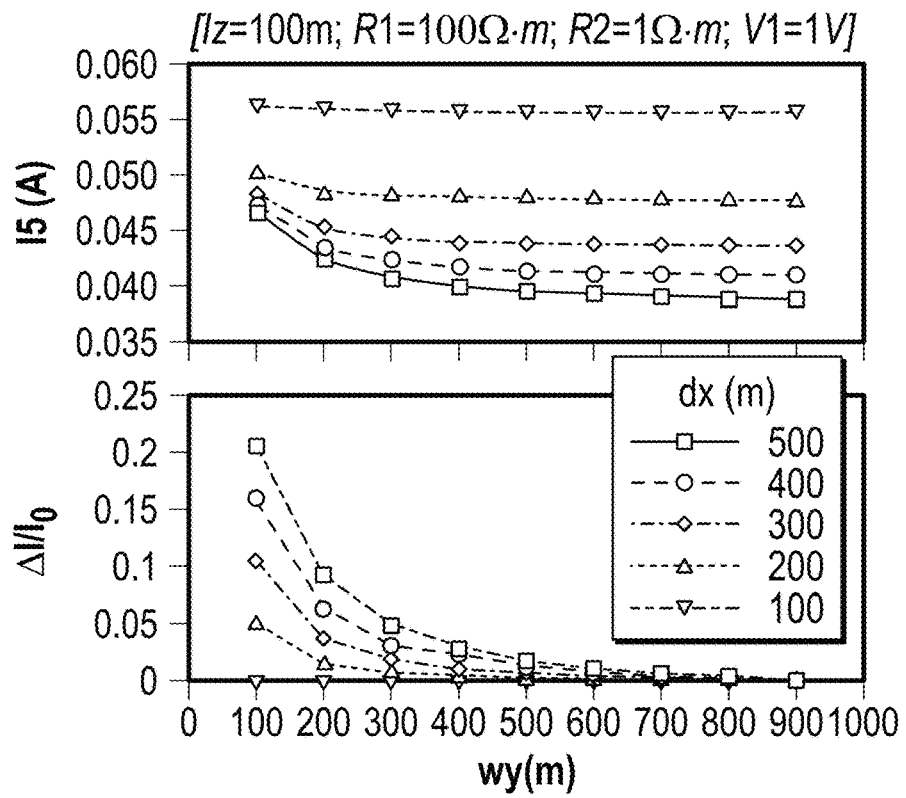
FIG. 8A shows current flowed into an electrode (top) and normalized current changes (bottom) as a function of water-front-to-electrode distance for various electrode distances in accordance with one or more embodiments.
Figure 8B:
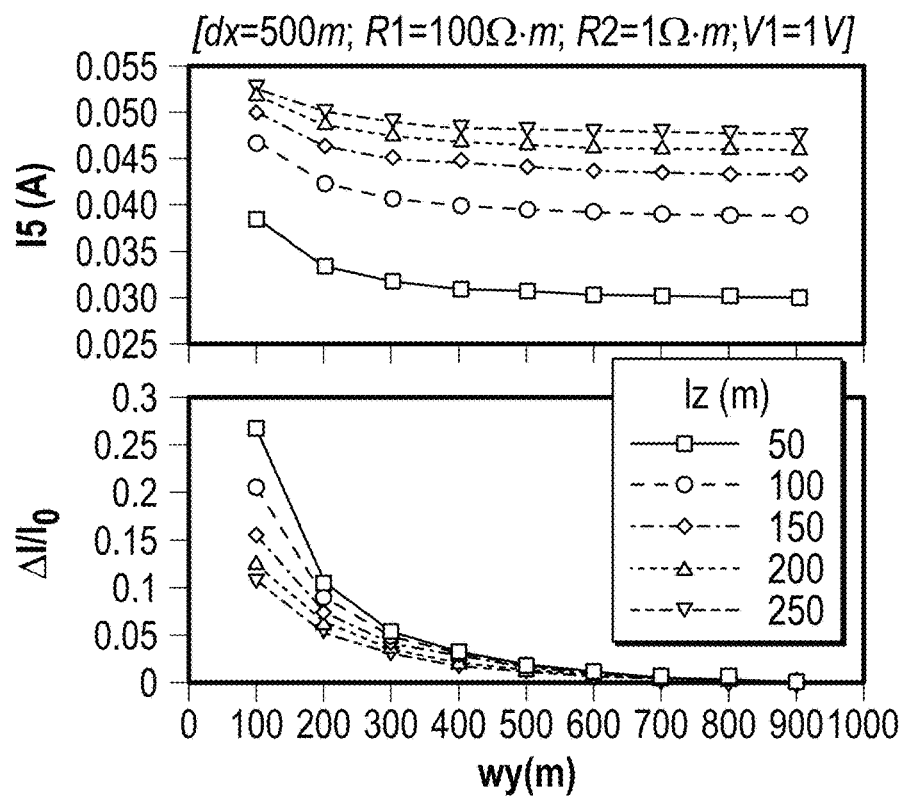
FIG. 8B shows current flowed into an electrode (top) and normalized current changes (bottom) as a function of water-front-to-electrode distance for various reservoir thicknesses in accordance with one or more embodiments.

The effects of different geometric factors were also analyzed. FIG. 8A shows the I5-wy and $\Delta I/I0$-wy curves with electrode distances, dx, ranging from 100 to 500 m. As shown, the magnitude of I5 increases with decreasing electrode distance, while the sensitivity for detecting waterfront movement ($\Delta I/I0$) decreases rapidly with decreasing electrode distance. FIG. 8B shows the I5-wy and $\Delta I/I0$-wy curves with reservoir thickness, lz, ranging from 50 to 250 m. As shown, the magnitude of I5 increases with increasing reservoir thickness, while the sensitivity for detecting waterfront movement ($\Delta I/I0$) decreases slightly with increasing reservoir thickness.

Figure 9A:
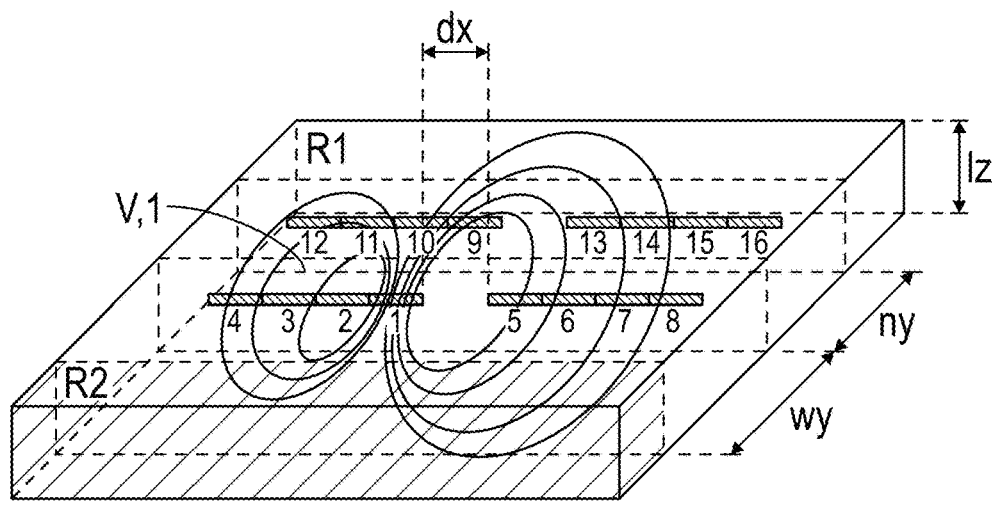
FIG. 9A is a schematic diagram of representative electrode geometry with the presence of neighboring electrodes in accordance with one or more embodiments.
Figure 9B:
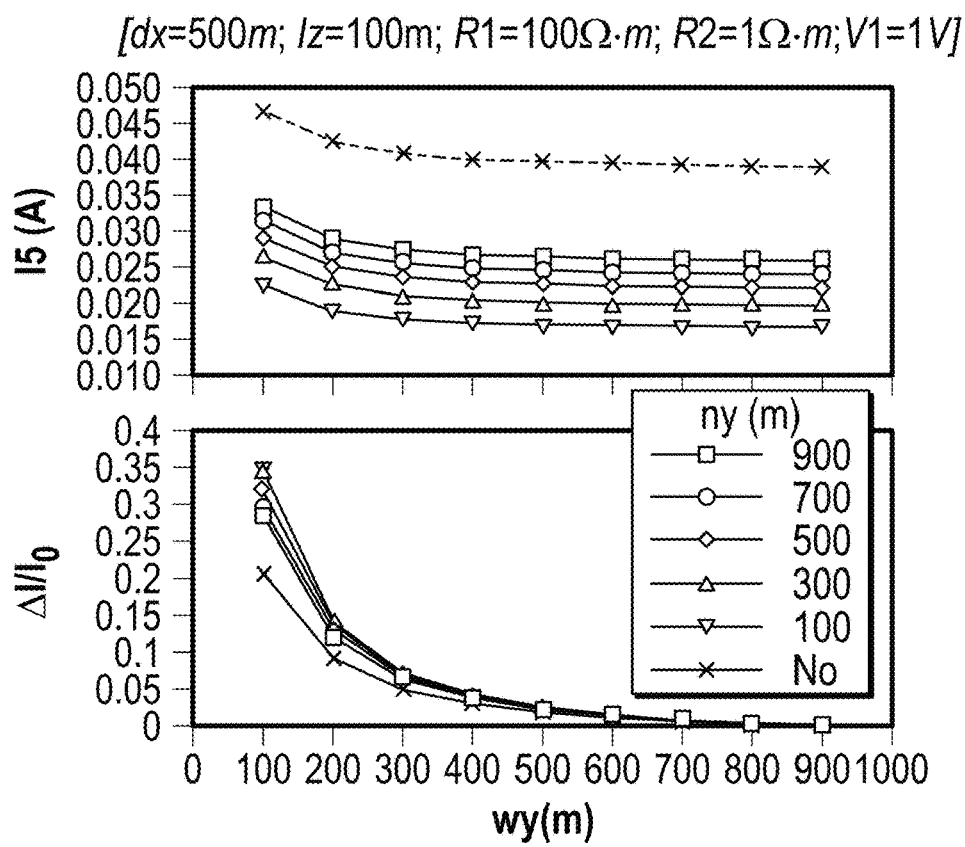
FIG. 9B shows current flowed into an electrode (top) and normalized current changes (bottom) as a function of water-front-to-electrode distance for various neighboring electrode distances in accordance with one or more embodiments.

Finally, the effect of neighboring electrodes that may divert current flows is analyzed. FIG. 9A shows the representative geometry where neighboring well liners with segments 9-16 were also fixed at 0 V. FIG. 9B shows the I5-wy and $\Delta I/I0$-wy curves with distances to the neighboring electrodes, ny, ranging from 100 to 900 m. In the same figure, the curves with no neighboring electrodes are presented. As can be seen, the neighboring electrodes reduced the magnitude of total current flowing into electrode 5 (I5); nevertheless, the sensitivity for detecting waterfront movement ($\Delta I/I0$) seemed not badly affected.

If different wells are interrogated in a cross-well mode (or two-sided mode) as shown in FIG. 5A, the two logging units may need to be kept well phase-synchronized; but maintaining synchronization should not be difficult with access to a modern global navigation satellite system (GNSS), for example, the Global Positioning System (GPS). Using short tool-strings and cased-hole wireline tractors to convey the PL tools, the deployment cost may be much lower than with coiled tube conveyance. Moreover, pressure risers and lubricators may be used to enable deployment of the PL tools without interrupting the wells' production, which would greatly relieve time pressure and eliminate lost revenue while performing these surveys. Furthermore, with measured currents of tens of milliamperes (mA) monitored for changes of several percentage points, surveys may be accomplished very quickly, with the time to move the contact electrodes dominating over actual measurement-averaging times. Therefore, a periodic monitoring survey should not take much more time than a simple PL run under similar well conditions.

In an EM survey, at least one source and one receiver are required to complete the circuit. In one-sided mode, both source and receiver can be put on a single well using one tool-string (e.g., convert well liner segments 411 as source and 414 as receiver). In two-sided mode, source and receiver are put on different wells (e.g., convert well liner segments 411 to source electrode and 410 as receiver electrode). A two-sided mode potentially may give longer range measurements than one-sided mode because the measurement range is a function of the separation between the source electrode and the receiver electrode.

According to one or more embodiments, after the initial measurement, one would have a baseline current strength that may be used when monitoring the wells for changes in the waterfront.

According to one or more embodiments, the EM survey may be performed repeatedly during production. If the low resistivity water is to replace the high resistivity oil when the waterfront moves closer to the wells, one may measure higher current strengths compared to the baseline. By observing the current strength changes with the help of forward modeling, one may predict the location of the waterfront 403, that is, the boundary between the water 401 and the hydrocarbon fluid 402, e.g. oil.

In one or more embodiments, the EM survey may be optimized during production after more and more data are collected.

Referring to FIG. 4A as a simple example, originally well liner in 408 may be used as a source electrode and well liners 409 may be used as receiver electrode. After production for a few years, when the waterfront moves too close to well liners 408 and 409, one may switch to use well liners 410 as a source and well liners 411 as receiver, for example. After further waterfront movement, possibly well liners 412 and 413 might be used for monitoring, etc.

In a richer "imaging" example, one may combine the measurements from well liner 408 as source electrode and well liner 409 as receiver electrode, and well liner 410 as a second source electrode and well liners 411, 414 as receivers electrodes, with the help of inverse modeling, to predict the precise shape of waterfront 403.

Figure 10:
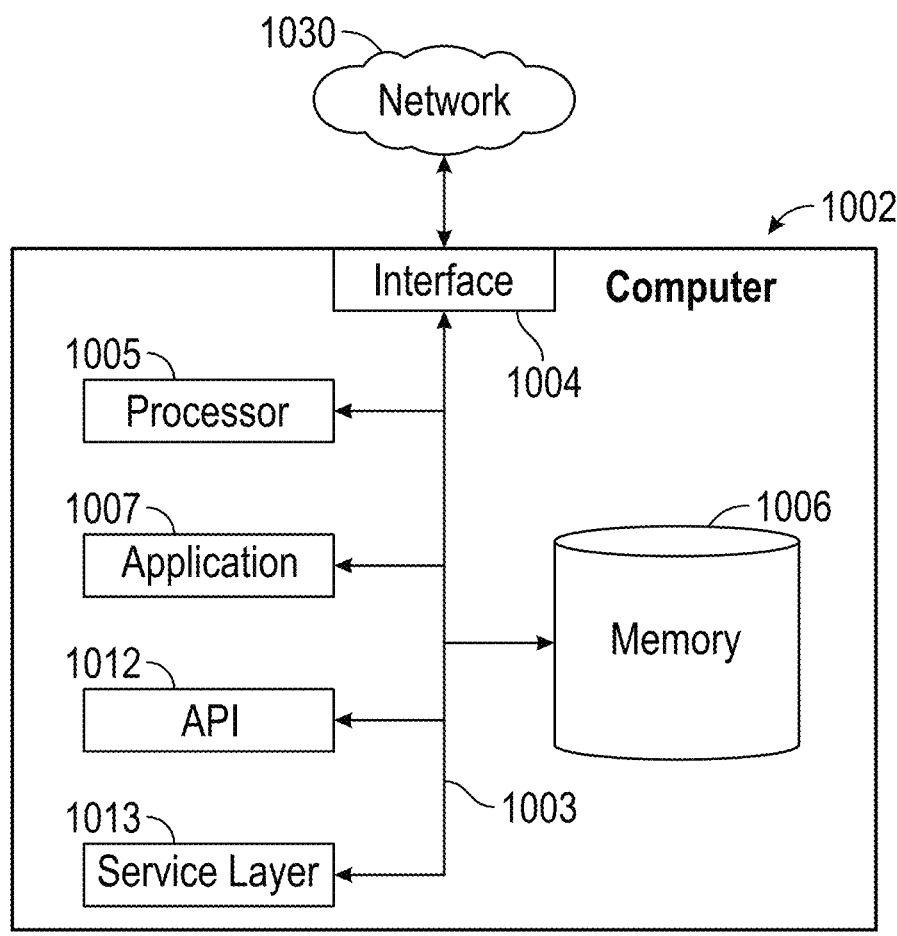
FIG. 10 shows a computer system in accordance with one or more embodiments.

Embodiments may be implemented on a computer system. FIG. 10 is a block diagram of a computer system 1002 used to provide computational functionalities associated with described algorithms, methods, functions, processes, flows, and procedures as described in the instant disclosure, according to an implementation. The illustrated computer 1002 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 1002 may include a computer that includes an input device, such as a keypad, keyboard, touch screen, or other device that can accept user information, and an output device that conveys information associated with the operation of the computer 1002, including digital data, visual, or audio information (or a combination of information), or a GUI.

The computer 1002 can serve in a role as a client, network component, a server, a database or other persistency, or any other component (or a combination of roles) of a computer system for performing the subject matter described in the instant disclosure. The illustrated computer 1002 is communicably coupled with a network 1030. In some implementations, one or more components of the computer 1002 may be configured to operate within environments, including cloud-computing-based, local, global, or other environment (or a combination of environments).

At a high level, the computer 1002 is an electronic computing device operable to receive, transmit, process, store, or manage data and information associated with the described subject matter. According to some implementations, the computer 1002 may also include or be communicably coupled with an application server, e-mail server, web server, caching server, streaming data server, business intelligence (BI) server, or other server (or a combination of servers).

The computer 1002 can receive requests over network 1030 from a client application (for example, executing on another computer 1002) and responding to the received requests by processing the said requests in an appropriate software application. In addition, requests may also be sent to the computer 1002 from internal users (for example, from a command console or by other appropriate access method), external or third-parties, other automated applications, as well as any other appropriate entities, individuals, systems, or computers.

Each of the components of the computer 1002 can communicate using a system bus 1003 In some implementations, any or all of the components of the computer 1002, both hardware or software (or a combination of hardware and software), may interface with each other or the interface 1004 (or a combination of both) over the system bus 1003 using an application programming interface (API) 1012 or a service layer 1013 (or a combination of the API 1012) and service layer 1013. The API 1012 may include specifications for routines, data structures, and object classes. The API 1012 may be either computer-language independent or dependent and refer to a complete interface, a single function, or even a set of APIs. The service layer 1013 provides software services to the computer 1002 or other components (whether or not illustrated) that are communicably coupled to the computer 1002. The functionality of the computer 1002 may be accessible for all service consumers using this service layer. Software services, such as those provided by the service layer 1013, provide reusable, defined business functionalities through a defined interface. For example, the interface may be software written in JAVA, C++, or other suitable language providing data in extensible markup language (XML) format or other suitable format. While illustrated as an integrated component of the computer 1002, alternative implementations may illustrate the API 1012 or the service layer 1013 as stand-alone components in relation to other components of the computer 1002 or other components (whether or not illustrated) that are communicably coupled to the computer 1002. Moreover, any or all parts of the API 1012 or the service layer 1013 may be implemented as child or sub-modules of another software module, enterprise application, or hardware module without departing from the scope of this disclosure.

The computer 1002 includes an interface 1004. Although illustrated as a single interface 1004 in FIG. 10, two or more interfaces 1004 may be used according to particular needs, desires, or particular implementations of the computer 1002. The interface 1004 is used by the computer 1002 for communicating with other systems in a distributed environment that are connected to the network 1030. Generally, the interface 1004 includes logic encoded in software or hardware (or a combination of software and hardware) and operable to communicate with the network 1030. More specifically, the interface 1004 may include software supporting one or more communication protocols associated with communications such that the network 1030 or interface's hardware is operable to communicate physical signals within and outside of the illustrated computer 1002.

The computer 1002 includes at least one computer processor 1005. Although illustrated as a single computer processor 1005 in FIG. 10, two or more processors may be used according to particular needs, desires, or particular implementations of the computer 1002. Generally, the computer processor 1005 executes instructions and manipulates data to perform the operations of the computer 1002 and any algorithms, methods, functions, processes, flows, and procedures as described in the instant disclosure.

The computer 1002 also includes a memory 1006 that holds data for the computer 1002 or other components (or a combination of both) that can be connected to the network 1030. For example, memory 1006 can be a database storing data consistent with this disclosure. Although illustrated as a single memory 1006 in FIG. 10, two or more memories may be used according to particular needs, desires, or particular implementations of the computer 1002 and the described functionality. While memory 1006 is illustrated as an integral component of the computer 1002, in alternative implementations, memory 1006 can be external to the computer 1002.

The application 1007 is an algorithmic software engine providing functionality according to particular needs, desires, or particular implementations of the computer 1002, particularly with respect to functionality described in this disclosure. For example, application 1007 can serve as one or more components, modules, applications, etc. Further, although illustrated as a single application 1007, the application 1007 may be implemented as multiple applications 1007 on the computer 1002. In addition, although illustrated as integral to the computer 1002, in alternative implementations, the application 1007 can be external to the computer 1002.

There may be any number of computers 1002 associated with, or external to, a computer system containing computer 1002, each computer 1002 communicating over network 1030. Further, the term "client," "user," and other appropriate terminology may be used interchangeably as appropriate without departing from the scope of this disclosure. Moreover, this disclosure contemplates that many users may use one computer 1002, or that one user may use multiple computers 1002.

While the invention has been described with respect to a limited number of embodiments, those skilled in the art, having the benefit of this disclosure, will appreciate that other embodiments can be devised that do not depart from the scope of the invention as described herein. Accordingly, the scope of the invention should be limited only by the accompanying claims.

What is claimed is:

1. A method for monitoring waterfront movement in a subsurface formation, the method comprising:
   using a computer processor:
   performing forward modeling of at least one deep low-frequency electromagnetic survey of the waterfront movement,
   determining, based on the forward modeling, locations for installing at least one electrically insulating spacer between a plurality of well liners to form at least one on-demand electromagnetic source electrode,
   determining, based on the forward modeling, locations for installing at least one electrically insulating spacer between a plurality of well liners to form at least one on-demand electromagnetic receiver electrode, and
   predicting, based on the forward modeling, a repeat survey time interval;
   during well completion:
   installing the at least one electrically insulating spacer between the plurality of well liners in a reservoir to form at least one on-demand electromagnetic source electrode, and
   installing the at least one electrically insulating spacer between the plurality of well liners in a reservoir to form at least one on-demand electromagnetic receiver electrode;
   electromagnetically performing waterfront surveys separated by the repeat time interval, wherein performing comprises: conveying into a well at least one production logging tool that temporarily converts the plurality of well liners into at least one on-demand electromagnetic source electrode and at least one on-demand receiver electrode, wherein temporarily converting the plurality of well liners into at least one on-demand electromagnetic source electrode comprises applying a low-frequency electrical signal,
   determining spatial distribution of resistivity and spatial distribution of permittivity based on inverse modeling of the waterfront survey; and
   producing, based the inverse modeling, a water saturation image.

2. The method according to claim 1, further comprising:
   performing a plurality of electromagnetic waterfront surveys separated by a plurality of time delays; and
   performing inverse modeling of the waterfront surveys; and producing, based the inverse modeling, a water saturation change image.

3. The method according to claim 1, wherein the at least one on-demand electromagnetic source electrode, and the at least one on-demand electromagnetic receiver electrode are located in different wellbores.

4. The method according to claim 1, wherein the at least one on-demand electromagnetic source electrode, and the at least one on-demand electromagnetic receiver electrode are located in the same wellbore.

5. The method according to claim 1, wherein performing the waterfront survey comprises controlling a source voltage and a source current of the at least one on-demand electromagnetic source electrode in a first well and monitoring a receiver voltage and a receiver current from the at least one on-demand electromagnetic receiver electrode in a second well.

6. The method according to claim 2, wherein performing the waterfront survey using the first and second wells further comprises receiving a plurality of signals from a global navigation satellite system, wherein the plurality of signals provide a common reference phase for the source current and the receiver current.

7. The method according to claim 1, wherein performing the waterfront survey comprises the at least one production logging tool converting the plurality of well liners by selectively addressing at least two well liners by making electrical contact with the at least the one temporary on-demand source electrode and the at least one temporary on-demand receiver electrode.

8. The method according to claim 1, wherein the produced water saturation image is three-dimensional.

9. A system for monitoring waterfront movement in a subsurface formation, comprising:
   a computer processor configured to:
   perform forward modeling of at least one deep low-frequency electromagnetic survey of the waterfront movement,
   determine, based on the forward modeling, locations for installing at least one electrically insulating spacer between a plurality of well liners to form at least one on-demand electromagnetic source electrode,
   determine, based on the forward modeling, locations for installing at least one electrically insulating spacer between a plurality of well liners to form at least one on-demand electromagnetic receiver electrode, and
   predict, based on the forward modeling, a repeat survey time interval;
   at least one electrically insulating spacer installed between the plurality of well liners in a reservoir, configured to form at least one on-demand electromagnetic source electrode in a source well;
   at least one electrically insulating spacer installed between the plurality of well liners in a reservoir, configured to form at least one on-demand electromagnetic receiver electrode in a receiver well;
   at least one production logging tool conveyed into a well, configured to:
   temporarily convert the plurality of well liners into at least one on-demand electromagnetic source electrode, wherein temporarily converting the plurality of well liners into at least one on-demand electromagnetic source electrode comprises applying a low-frequency electrical signal,
   temporarily convert the plurality of well liners into at least one on-demand electromagnetic receiver electrode, and
   electromagnetically perform waterfront surveys with the repeat survey time interval; and
   the computer processor further configured:
   to determine spatial distribution of resistivity and spatial distribution of permittivity based on inverse modeling of the waterfront survey; and
   produce, based the inverse modeling, a water saturation image.

10. The system according to claim 9, wherein the at least one on-demand electromagnetic source electrode, and the at least one on-demand electromagnetic receiver electrode are located in different wellbores.

11. The system according to claim 9, wherein the at least one on-demand electromagnetic source electrode, and the at least one on-demand electromagnetic receiver electrode are located in the same wellbore.

12. The system according to claim 9, wherein performing the waterfront survey comprises controlling a source voltage and a source current of the at least one on-demand electromagnetic source electrode in a first well and monitoring a receiver voltage and a receiver current from the at least one on-demand electromagnetic receiver electrode in a second well.

13. The system according to claim 12, wherein performing the waterfront survey using the first and second wells further comprises receiving a plurality of signals from a global navigation satellite system, wherein the plurality of signals provide a common reference phase for the source current and the receiver current.

14. The system according to claim 9, wherein performing the waterfront survey comprises the at least one production logging tool converting the plurality of well liners by selectively addressing at least two well liners by making electrical contact with the at least the temporary one on-demand source electrode and the at least one temporary on-demand receiver electrode.

15. The system according to claim 9, wherein the produced water saturation image is three-dimensional.

\* \* \* \* \*